United States Patent
Mahjourian et al.

(10) Patent No.: US 11,348,268 B2
(45) Date of Patent: May 31, 2022

(54) UNSUPERVISED LEARNING OF IMAGE DEPTH AND EGO-MOTION PREDICTION NEURAL NETWORKS

(71) Applicant: Google LLC, Mountain View, CA (US)

(72) Inventors: Reza Mahjourian, Austin, TX (US); Martin Wicke, San Francisco, CA (US); Anelia Angelova, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/010,967

(22) Filed: Sep. 3, 2020

(65) Prior Publication Data

US 2020/0402250 A1 Dec. 24, 2020

Related U.S. Application Data

(60) Division of application No. 16/861,441, filed on Apr. 29, 2020, now Pat. No. 10,810,752, which is a
(Continued)

(51) Int. Cl.
*G06K 9/00* (2022.01)
*G06T 7/579* (2017.01)
(Continued)

(52) U.S. Cl.
CPC .......... *G06T 7/579* (2017.01); *G06N 3/0454* (2013.01); *G06N 3/084* (2013.01); *G06T 7/285* (2017.01); *G06T 2207/20081* (2013.01)

(58) Field of Classification Search
CPC ......... G06T 7/579; G06T 7/285; G06N 3/084; G06N 3/454; G06K 9/6281; G06K 9/6272;
(Continued)

(56) References Cited

U.S. PATENT DOCUMENTS 6,931,269 B2 * 8/2005 Terry ................. A61B 5/14552
600/336
8,422,741 B2 * 4/2013 Eggert .................... G06T 7/269
382/107
(Continued)

FOREIGN PATENT DOCUMENTS

WO   WO 2018/102717   6/2018

OTHER PUBLICATIONS

IN Office Action in Indian Application No. 202027016267, dated Jun. 16, 2021, 6 pages (with English translation).
(Continued)

*Primary Examiner* — Amir Alavi
(74) *Attorney, Agent, or Firm* — Fish & Richardson P.C.

(57) ABSTRACT

A system includes a neural network implemented by one or more computers, in which the neural network includes an image depth prediction neural network and a camera motion estimation neural network. The neural network is configured to receive a sequence of images. The neural network is configured to process each image in the sequence of images using the image depth prediction neural network to generate, for each image, a respective depth output that characterizes a depth of the image, and to process a subset of images in the sequence of images using the camera motion estimation neural network to generate a camera motion output that characterizes the motion of a camera between the images in the subset. The image depth prediction neural network and the camera motion estimation neural network have been jointly trained using an unsupervised learning technique.

20 Claims, 4 Drawing Sheets

Related U.S. Application Data continuation of application No. PCT/US2018/061300, filed on Nov. 15, 2018.

(60) Provisional application No. 62/586,611, filed on Nov. 15, 2017.

(51) Int. Cl.
*G06T 7/285* (2017.01)
*G06N 3/04* (2006.01)
*G06N 3/08* (2006.01)

(58) Field of Classification Search
CPC ........ G06K 9/344; G06K 9/32; G06K 9/4628; G06K 9/66; G06K 9/6216
See application file for complete search history.

(56) References Cited

U.S. PATENT DOCUMENTS

| | | | |
|---|---|---|---|
| 9,405,975 B2 | 8/2016 | Izhikevich | |
| 9,436,909 B2 | 9/2016 | Piekniewski | |
| 9,881,349 B1 | 1/2018 | Meier | |
| 10,006,981 B2* | 6/2018 | Tidhar | G01S 13/582 |
| 10,402,700 B2* | 9/2019 | van den Oord | H04N 19/52 |
| 10,474,993 B2* | 11/2019 | Fisher | G06Q 10/087 |
| 10,482,607 B1* | 11/2019 | Walters | G06F 40/117 |
| 10,529,137 B1* | 1/2020 | Black | G06N 3/08 |
| 10,572,072 B2* | 2/2020 | Wang | G06K 9/00087 |
| 10,628,961 B2* | 4/2020 | Sundaresan | G06T 7/74 |
| 10,671,855 B2 | 6/2020 | Lee | |
| 2017/0278289 A1* | 9/2017 | Marino | G06T 11/60 |
| 2019/0026956 A1 | 1/2019 | Gausebeck | |
| 2019/0122373 A1 | 4/2019 | Natroshvili | |
| 2020/0258249 A1* | 8/2020 | Angelova | G06T 7/20 |
| 2020/0402250 A1* | 12/2020 | Angelova | G06T 7/20 |

OTHER PUBLICATIONS

Godard et al, "Unsupervised Monocular Depth Estimation with Left-Right Consistency" arXiv, Sep. 2016, 9 pages.
Mahjourian et al, "Unsupervised Learning of Depth and Egomotion from Monocular Video Using 3D Geometric Constraints" arXiv, Feb. 2018, 9 pages.
PCT International Preliminary Report on Patentability in International Application No. PCT/US2018/061300, dated May 19, 2020, 12 pages.
PCT International Search Report and Written Opinion in International Application No. PCT/US2018/061300, dated Feb. 5, 2019, 19 pages.
Ruder, "An overview of gradient descent optimization algorithms" arXiv, Sep. 2016, 12 pages.
Vijayanarasimhan et al, "SfM-Net: Learning of Structure and Motion from Video" arXiv, Apr. 2017, 9 pages.
Zhou et al, "Unsupervised Learning of Depth and Ego—Motion from Video" arXiv, Apr. 2017, 10 pages.
EP Office Action in European Application No. 18812573.6, dated Nov. 12, 2021, 10 pages.
Github.io [online], "Camera model: intrinsic parameters" Jul. 2018, retrieved Nov. 8, 2021, retrieved from URL <https://lhoangan.github.io/camera-params/>, 8 pages.
JP Office Action in Japanese Application No. 2020-526495, dated Dec. 20, 2021, 9 pages (with English translation).

* cited by examiner

UNSUPERVISED LEARNING OF IMAGE DEPTH AND EGO-MOTION PREDICTION NEURAL NETWORKS

CROSS-REFERENCE TO RELATED APPLICATION

This application is a divisional of U.S. patent application Ser. No. 16/861,441, filed Apr. 29, 2020, which is a continuation of International Application No. PCT/US2018/061300, filed Nov. 15, 2018, which claims priority to U.S. Provisional Application Ser. No. 62/586,611, filed on Nov. 15, 2017. The disclosure of the prior applications are considered part of and are incorporated by reference in the disclosure of this application.

BACKGROUND

This specification relates to processing images using neural networks.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

In general, one innovative aspect of the subject matter described in this specification can be embodied in a system that includes a neural network implemented by one or more computers. The neural network includes an image depth prediction neural network and a camera motion estimation neural network. The neural network is configured to receive a sequence of images. The neural network is configured to process each image in the sequence of images using the image depth prediction neural network to generate, for each image, (i) a respective depth output that characterizes a depth of the image. The neural network is configured to process a subset of images in the sequence of images using the camera motion estimation neural network to generate a camera motion output that characterizes the motion of a camera between the images in the subset. The image depth prediction neural network and the camera motion estimation neural network have been jointly trained using an unsupervised learning technique.

The foregoing and other embodiments can each optionally include one or more of the following features, alone or in combination. The sequence of images may be frames of a video captured by the camera. The depth output may include an estimated depth value for each pixel of a plurality of pixels in the image that represents a respective distance of a scene depicted at the pixel from a focal plane of the image. The camera motion output may be a transformation matrix that transforms the position and orientation of the camera from its point of view while taking a first image in the subset to its point of view while taking a second image in the subset. The image depth prediction neural network may include convolutional neural network layers. The camera motion estimation neural network may include convolutional neural network layers. The subset of images may include two images in the sequence of images. The subset of images may include three or more images in the sequence of images. The unsupervised learning technique may comprise the operations described below with respect to the method of training the neural network.

Another innovative aspect of the subject matter described in this specification can be embodied in one or more computer storage media encoded with instructions that, when executed by one or more computers, cause the one or more computers to implement the above-described system.

Another innovative aspect of the subject matter described in this specification can be embodied in a method of training the neural network of the above-described system. The method includes: obtaining training data including a sequence of images and performing the following operations for each particular image in the sequence of images.

For each particular image in the sequence, the method includes processing the particular image using the image depth prediction neural network to generate a first depth estimate that characterizes a first depth of the particular image; processing a second image following the particular image in the sequence using the depth prediction neural network to generate a second depth estimate that characterizes a second depth of the second image; processing the particular image and the second image using the camera motion estimation neural network to generate a first transformation matrix that transforms the position and orientation of a camera from its point of view while taking the particular image to its point of view while taking the second image; and backpropagating an estimate of a gradient of a loss function to jointly adjust the current values of the parameters of the depth prediction neural network and the camera motion estimation neural network based on the first depth estimate, the second depth estimate, and the first transformation matrix.

The foregoing and other embodiments can each optionally include one or more of the following features, alone or in combination.

The loss function may include a 3D-based point cloud alignment loss component that minimizes point-to-point distances between two point clouds generated from the particular image and the second image.

The loss function may include an image reconstruction loss component that maintains photometric consistency of (i) the particular image and a corresponding reconstructed image generated from the second image, and (ii) the second image and a corresponding second reconstructed image generated from the first image.

The loss function may include a structured similarity loss component that maintains (i) the similarity of patches in the particular image and the reconstructed image, and (ii) the similarity of patches in the second image and the second reconstructed image.

The loss function may further include a depth smoothness loss component that allows for (i) sharp changes in the first depth estimate at pixel coordinates where there are sharp changes in the particular image, and (ii) sharp changes in the second depth estimate at pixel coordinates where there are sharp changes in the second image.

The loss function can be a weighted combination of respective components of the loss function. The loss function can be a weighted combination of one or more of the following components: (i) the 3D-based point cloud alignment loss component, (ii) the image reconstruction loss component, (iii) the structured similarity loss component, and (iv) the depth smoothness loss component. For example, the loss function can be weighted combination of (i) the 3D-based point cloud alignment loss component, (ii) the image reconstruction loss component, (iii) the structured similarity loss component, and (iv) the depth smoothness loss component.

Backpropagating the estimate of the gradient of the loss function may include: computing the 3D-based point cloud alignment loss component by repeatedly estimating a best-fit transformation that minimizes the point-to-point distances between points in a first point cloud and their corresponding points in a second point cloud.

Backpropagating the estimate of the gradient of the loss function may include computing the reconstruction loss component by (i) analytically computing a validity mask that indicates valid pixel coordinates in the first reconstructed image based on the first depth estimate and the first transformation matrix, and (ii) analytically computing a second validity mask that indicates valid pixel coordinates in the second reconstructed image based on the second depth estimate and an inverse of the first transformation matrix.

In some cases, the method may include adjusting the current values of the parameters of the image depth prediction neural network and the camera motion estimation neural network using mini-batch stochastic optimization. In some cases, the method may include adjusting the current values of the parameters of the image depth prediction neural network and the camera motion estimation neural network using stochastic gradient optimization.

The sequence of training images may be frames of a video captured by the camera. The second image may immediately follow the particular image in the sequence of images. The first depth estimate may include an estimated depth value for each pixel of a plurality of pixels in the particular image that represents a respective distance of a scene depicted at the pixel from a focal plane of the particular image. The second depth estimate may include an estimated depth value for each pixel of a plurality of pixels in the second image that represents a respective distance of a scene depicted at the pixel from a focal plane of the second image.

The subject matter described in this specification can be implemented in particular embodiments so as to realize one or more of the following advantages. The subject matter described in this specification is generally directed to a training scheme for unsupervised learning of depth and camera motion (or ego-motion) from a sequence of images, e.g., frames of a video captured by a camera of a robotic agent (i.e. a monocular video). As the training scheme only requires very few sources of information for training (e.g., a monocular video taken by a camera), training image depth and camera motion estimation neural networks on large and varied datasets becomes possible. Considering the fact that cameras are the most ubiquitous sensor available and high quality cameras are inexpensive and easy to deploy, the ability of the training scheme to train neural networks on arbitrary monocular videos taken by a camera in an unsupervised manner, i.e., without requiring any external labelling of the monocular videos opens up a practically infinite amount of training data, and thus eliminating sensing artifacts (e.g., sensing noise/errors present in labeled data) or inter-sensor calibration issues. In other words, the training method enables more data to be usable as training data and does not require specifically labelled depth data which may be limited in quantity.

While prior approaches use pixel-wise or gradient-based losses, which only consider pixels in small local neighborhoods and lead to predictions of deteriorated quality, the training scheme described in this specification takes into account the 3D geometry of the whole scene by incorporating a 3D-based point cloud alignment loss into the training loss function. The 3D-based loss enforces the consistency of the estimated 3D point clouds and ego-motion across consecutive frames of the video.

In addition, the training scheme combines the novel 3D-based loss with a structured similarity loss based on photometric quality of frame reconstructions using estimated depth and ego-motion from adjacent frames.

The training scheme further incorporates validity masks in an image reconstruction loss to avoid penalizing areas in which no useful information exists. Previous approaches includes such areas in the loss, thus degrading performances of the neural networks (for example, causing edge artifacts in the depth output of an image). By computing validity masks analytically and incorporating the masks in the image reconstruction loss, the training scheme improves performances of the depth and camera motion neural networks.

In addition, the training scheme employs a depth smoothness loss to regularize a depth estimate of an input image by taking into account the gradients of the input image. By considering the gradients of the input image, the depth smoothness loss allows for sharp changes in depth at pixel coordinates where there are sharp changes in the input image, thereby enabling the trained depth prediction neural network to generate depth estimates that are more realistic and accurate.

A depth prediction neural network and a camera motion estimation neural network that are trained using the above-described training scheme is capable of producing depth estimates and camera ego-motion estimates with higher quality (for example, higher accuracy, higher fidelity, and more realistic) compared to other neural networks that are trained by using conventional methods. Such estimates may be used for control of a robotic agent or autonomous vehicle, for example to aid in navigation. The estimates produced by the trained neural networks do not require expensive and difficult to calibrate depth sensors to provide input data and may be obtained using inexpensive and easy to deploy monocular video cameras.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a neural network system implemented as computer programs on one or more computers in one or more locations that is configured to generate image depth and ego-motion estimates from a sequence of input images using an image depth prediction neural network and a camera motion estimation neural network.

Figure 1:
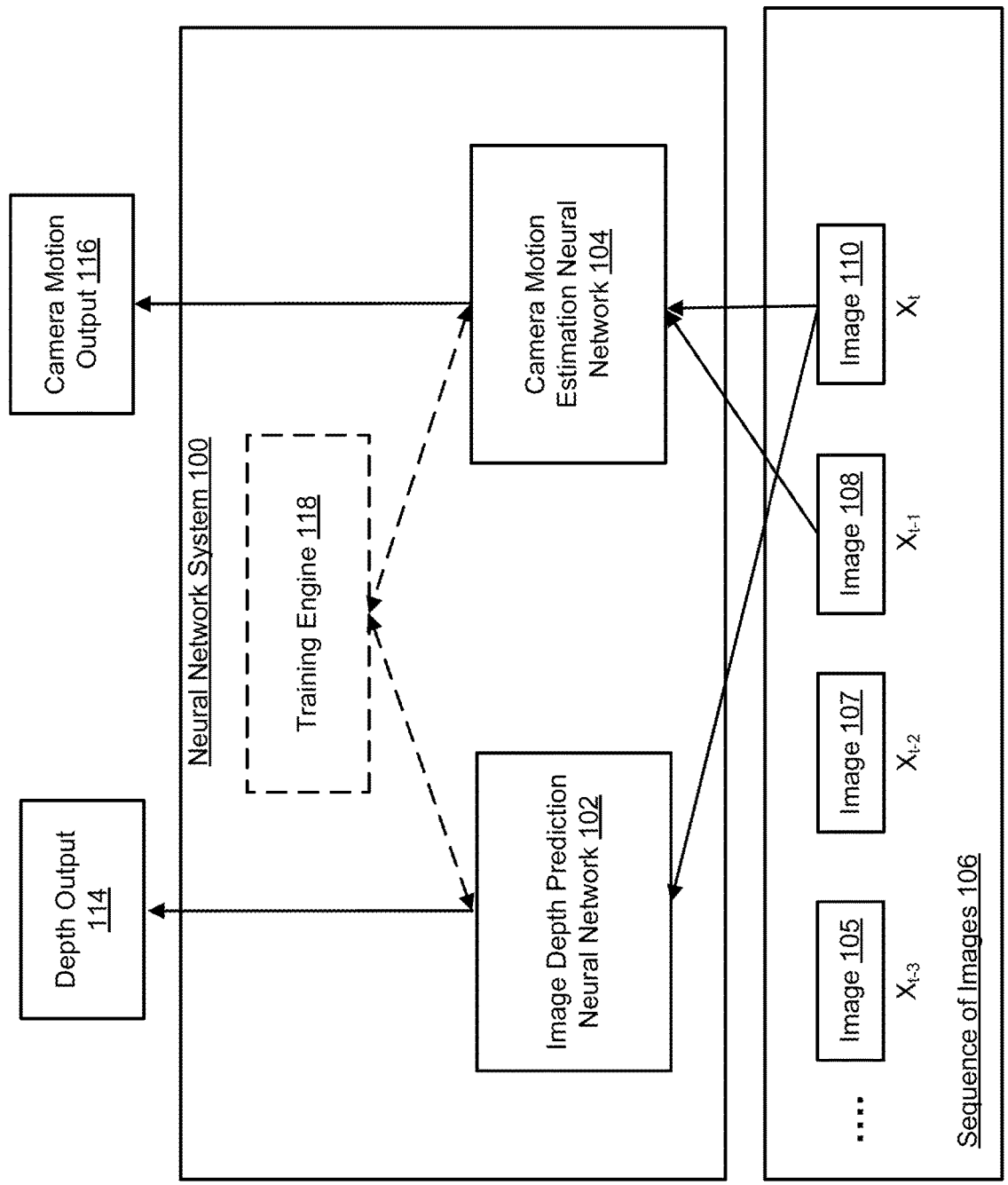
FIG. 1 shows an architecture of an example neural network system.

FIG. 1 shows an example architecture of a neural network system 100. The neural network system 100 is an example of a system implemented as computer programs on one or more computers in one or more locations, in which the systems, components, and techniques described below can be implemented.

In general, the neural network system 100 is configured to receive a sequence of images 106 and to process each image in the sequence to generate a depth output that characterizes a depth of the image, and to process a subset of images in the sequence to generate a camera motion output characterizing the motion of a camera between images in the subset. For example, the sequence of images 106 may include frames of a monocular video being captured by a camera of a robotic agent. As another example, the sequence of images 106 may include frames of a monocular video captured using a camera of a mobile device (e.g., by a camera of a hand-held commercial phone while a user of phone is riding a bicycle). The sequence 106 does not necessarily have to include all of the frames from the video. For example, the sequence 106 may include every other frame of the video.

To generate the depth outputs and camera motion outputs, the neural network system 100 includes an image depth prediction neural network 102 (hereafter referred to as "the depth network 102" for simplicity) and a camera motion estimation neural network 104 (hereafter referred to as "the camera motion network 104"). Each of the depth network 102 and the camera motion network 104 includes one or more convolutional neural network layers. In some implementations, the depth network 102 and the camera motion network 104 are fully convolutional neural networks.

The depth network 102 is configured to process each image in the sequence of images 106 to generate, for each image, a respective depth output that characterizes a depth of the image in accordance with current values of depth parameters of the depth network 102. The depth output generated for a given image includes a predicted depth value for each pixel of multiple pixels in the given image. The depth value of a pixel is a representation of a perpendicular distance between (i) a plane in which the given image is recorded, and (ii) a scene depicted at the pixel (for example, the actual or virtual location of an object or part of an object that the pixel depicts). The plane in which the image is recorded may be a focal plane, for example, the focal plane of a camera or virtual camera.

In the example of FIG. 1, the depth network 102 processes image 110 in the sequence of images 106 to generate a depth output 114 for the image 110. Image 110 can be denoted as $X_t$, where t is the time when the image was captured by the camera. The depth output 114 is generated from the current image 110 independently of other images in the sequence 106.

The camera motion network 104 is configured to process a subset of images in the sequence of images 106 to generate a camera motion output that characterizes the motion of a camera between the images in the subset in accordance with current values of motion parameters of the camera motion network 104.

In some implementations, the subset of images includes two images from the sequence of images 106. For example, as shown in FIG. 1, the subset of images includes two consecutive images $X_{t-1}$ (108) and $X_t$ (110), which are taken by the camera at times t-1 and t, respectively. The camera motion network 104 processes images $X_{t-1}$ and $X_t$ to generate a camera motion output 116 that is a transformation matrix that transforms the position and orientation of the camera from its point of view while taking the image $X_{t-1}$ to its point of view while taking the image $X_t$. In other words, the camera motion out 116 represents the camera's movement (position and orientation) from time t-1 to time t.

In some other implementations, the subset of images includes three or more images from the sequence of images 106. For example, the subset of images may include images $X_{t-2}$, $X_{t-1}$, and $X_t$. In this example, given the subset of images, the camera motion network 104 generates a camera motion output that represents the camera's movement from time t-2 to time t.

To efficiently generate depth outputs and camera motion outputs for a sequence of images, the neural network system 100 includes a training engine 118, which is a software-based system, subsystem, or process that is programmed to jointly train the depth network 102 and the camera motion network 104 on training data using an unsupervised learning technique. Generally, the training engine 118 will be implemented as one or more software modules or components, installed on one or more computers in one or more locations. In some cases, one or more computers will be dedicated to a particular engine; in other cases, multiple engines can be installed and running on the same computer or computers.

In particular, during training, the training engine 118 obtains training data including a sequence of training images. The training images can be frames of a video being captured by a camera of a robotic agent.

For each particular image in the sequence of training images, the training engine 118 repeatedly perform the following operations.

For each particular image, training engine 118 processes the particular image using the depth network 102 to generate, in accordance with current values of the depth parameters of the depth network 102, a first depth estimate that characterizes a first depth of the particular image. The training engine 118 processes a second image following the particular image in the sequence using the depth network 102, in accordance with the current values of the depth parameters of the depth network 102, to generate a second depth estimate that characterizes a second depth of the second image. The training engine 118 processes the particular image and the second image using the camera motion network 104 to generate a first transformation matrix that transforms the position and orientation of the camera from its point of view while taking the particular image to its point of view while taking the second image. The training engine 118 then backpropagates an estimate of a gradient of a loss function to jointly adjust the current values of the parameters of the depth network 102 and the camera motion network 104. The loss function is computed based on the first depth estimate, the second depth estimate, and the first transformation matrix.

Generally, the loss function includes a 3D-based point cloud alignment loss component that minimizes point-to-point distances between (i) points in a first point cloud generated from the particular image and (ii) their corresponding points in a second point cloud generated from the second image. The processing for generating the 3D-based point cloud alignment loss component is described in detail below with reference to FIG. 3.

The loss function can further include one or more of the following loss components: an image reconstruction loss component, a structured similarity loss component, and a depth smoothness loss component. The image reconstruction loss component maintains photometric consistency of (i) the particular image and a first reconstructed image generated from the second image, and (ii) the second image and a second reconstructed image generated from the particular image. The structured similarity loss component maintains (i) the similarity of patches in the particular image and the first reconstructed image, and (ii) the similarity of patches in the second image and the second reconstructed image. The depth smoothness loss component allows for (i) sharp changes in the first depth estimate at pixel coordinates where there are sharp changes in the particular image, and (ii) sharp changes in the second depth estimate at pixel coordinates where there are sharp changes in the second image.

During training, the training engine 118 can repeatedly perform the above operations to adjust the values of the parameters of the depth network 102 and the camera motion neural network 104 to minimize the loss function by using a mini-batch stochastic optimization or stochastic gradient optimization method.

The process for jointly training the depth network 102 and the camera motion network 104 and for computing each component in the loss function is described in more detail below with respect to FIG. 2.

After training, the neural network system 100 can use the depth network 102 to generate a depth output for a given input image in accordance with the trained values of depth parameters of the depth network 102, and use the camera motion network 104 to generate a camera motion output for multiple input images in accordance with the trained values of motion parameters of the camera motion network 104.

In some cases, the neural network system 100 can provide the trained depth network 102 and the trained camera motion network 104 or the trained values of the parameters of the networks to an external system. The external system can use the trained depth network 102 and the trained camera motion 104 to generate depth outputs and camera motion outputs for a sequence of input images in the manner described above.

As a particular example, after training, the system 100 or the external system can use the depth output and camera motion outputs to control a robot while the robot interacts with an environment. By having the depth outputs and camera motion outputs available as input to a control policy or a planner for the robot, the robot can be more effectively controlled to complete specified tasks in the environment.

Figure 2:
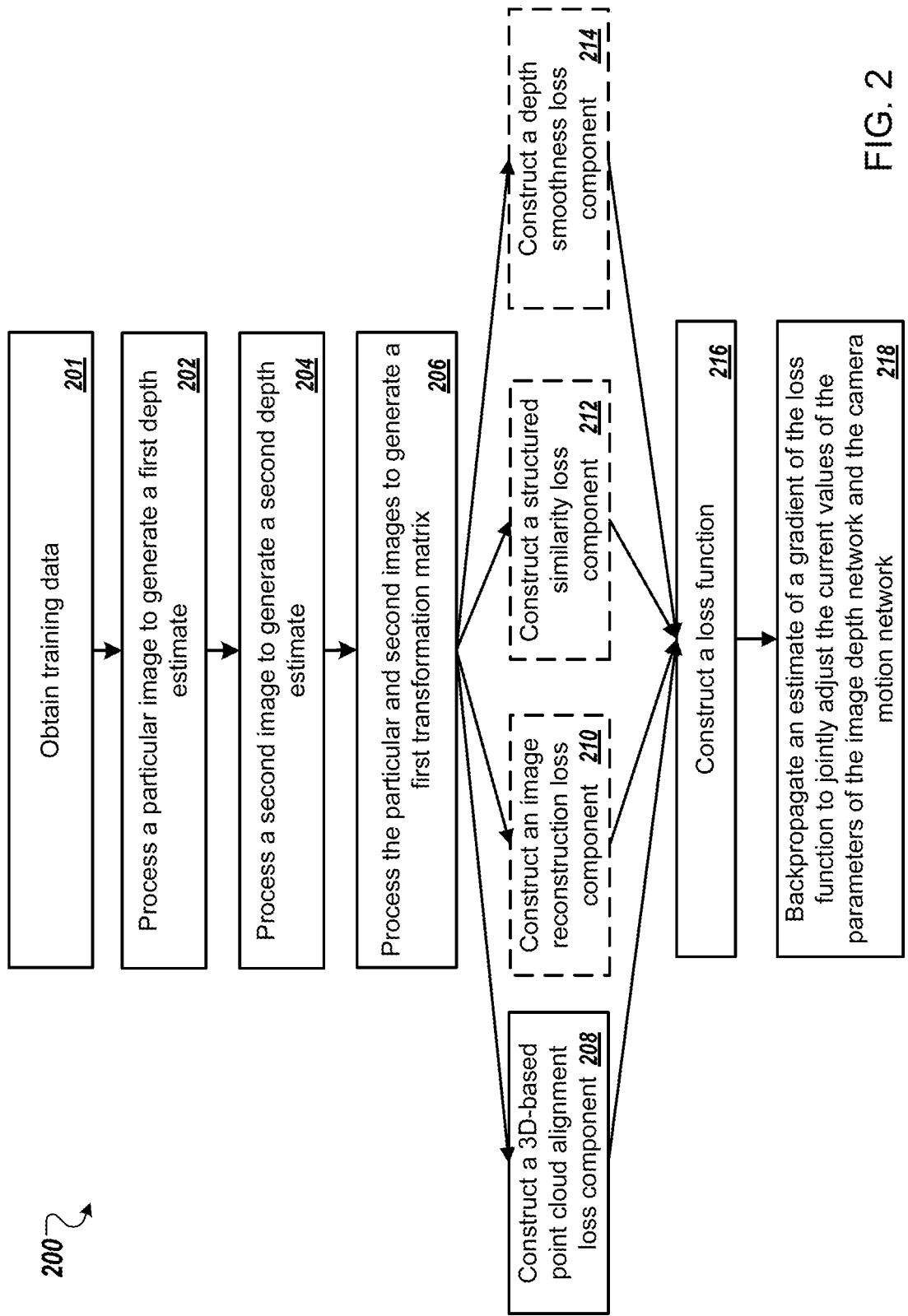
FIG. 2 is a flow diagram of an example process for jointly training an image depth prediction neural network and a camera motion estimation neural network.

FIG. 2 is a flow diagram of an example process 200 for jointly training an image depth prediction neural network and a camera motion estimation neural network (for example, the depth network 102 and the camera motion network 104 of FIG. 1). For convenience, the process 200 will be described as being performed by a system of one or more computers located in one or more locations. For example, a neural network system, e.g., the neural network system 100 of FIG. 1, appropriately programmed, can perform the process 200.

The system can repeatedly perform the process 200 on different sequences of training images that are included in training data in order to repeatedly update the parameter values of the image depth prediction neural network and the camera motion estimation neural network.

The system obtains a sequence of training images (step 201). For example, the training images can be frames of a video being captured by a camera of a robotic agent or by a camera of a mobile device. The sequence of training images does not necessarily include all consecutive frames of the video. For example, the sequence of training image may include every other frame of the video.

For each particular image $X_{t-1}$ in the sequence of training images, the system repeatedly performs the following operations (steps 202-218).

The system processes the particular image $X_{t-1}$ using the depth network to generate, in accordance with current values of depth parameters of the depth network, a first depth estimate $D_{t-1}$ that characterizes a first depth of the particular image $X_{t-1}$ at time t-1 (step 202).

The system processes a second image $X_t$ following the particular image $X_{t-1}$ in the sequence using the depth network, in accordance with the current values of the depth parameters of the depth network, to generate a second depth estimate $D_t$ that characterizes a second depth of the second image $X_t$ at time t (step 204).

The system processes the particular image $X_{t-1}$ and the second image $X_t$ using the camera motion network to generate a first transformation matrix $T_t$ (step 206). The first transformation matrix $T_t$, which is also referred to as ego-motion, represents the camera's movement (position and orientation) from time t-1 to time t. That is, the first transformation matrix $T_t$ transforms the position and orientation of the camera from its point of view while taking the particular image $X_{t-1}$ to its point of view while taking the second image $X_t$.

To construct a loss function for jointly training the depth and camera motion networks, the system first constructs a 3D-based point cloud alignment loss component that minimizes point-to-point distances between two point clouds generated from the particular image $X_{t-1}$ and and the second image $X_t$ (step 208).

In particular, the system generates a 3D point cloud $Q_t$ for the second image $X_t$ based on the second depth estimate $D_t$ of the second image $X_t$. Each image pixel at coordinate (i, j) with a corresponding estimated depth value $D_t^{ij}$ can be projected into the structured 3D point cloud $Q_t$ as follows:

$$Q_t^{ij} = D_t^{ij} \cdot K^{-1}[i,j,1]^T \qquad (1)$$

where K is a camera intrinsic matrix and the coordinates are homogeneous.

Given the first transformation matrix $T_t$, which represents the camera's movement from t-1 to t, the system transforms the 3D point cloud $Q_t$ to obtain an estimate of the previous image (the particular image $X_{t-1}$)'s point cloud $\hat{Q}_{t-1}$ as follows:

$$\hat{Q}_{t-1} = T_t^{-1} \cdot Q_t, \qquad (2)$$

where $T_t^{-1}$ represents the inverse of the camera's movement from t to t-1.

Similarly, the system generates a 3D point cloud $Q_{t-1}$ for the particular image $X_{t-1}$ based on the first depth estimate $D_{t-1}$ of the particular image $X_{t-1}$. Each image pixel at coordinate (i, j) with a corresponding estimated depth value $D_{t-1}^{ij}$ can be projected into the structured 3D point cloud $Q_{t-1}$ as follows:

$$Q_{t-1}^{ij} = D_{t-1}^{ij} \cdot K^{-1}[i,j,1]^T, \qquad (3)$$

where K is a camera intrinsic matrix and the coordinates are homogeneous.

The system then transforms the 3D point cloud $Q_{t-1}$ to obtain an estimate of the second image $X_t$'s point cloud $\hat{Q}_t$ as follows:

$$\hat{Q}_t = T_t \cdot Q_{t-1}, \qquad (4)$$

where $T_t$ represents the camera's movement from t-1 to t.

The 3D-based point cloud alignment loss component directly compares two 3D point clouds: $\hat{Q}_{t-1}$ to $Q_{t-1}$, or $\hat{Q}_t$ to $Q_t$. That is, in some cases, the 3D-based point cloud alignment loss component can compare (i) an estimate of the particular image's point cloud $\hat{Q}_{t-1}$ generated from the second image's point cloud $Q_t$ to (ii) the particular image's point cloud $Q_{t-1}$. In some cases, the 3D-based point cloud alignment loss component can compare (i) an estimate of the second image's point cloud $\hat{Q}_t$ generated from the particular image's point cloud $Q_{t-1}$ to (ii) the second image's point cloud $Q_t$.

To construct the 3D-based point cloud alignment loss component, the system uses a rigid registration method, for example, an Iterative Closest Point (ICP) process, to compute (i) a best-fit transformation T' that minimizes point-to-point distances between corresponding points in the two point clouds, and (ii) a residual registration error r that represents residual distances between corresponding points after the ICP's best-fit transformation T' for minimizing point-to-point distances has been applied. The ICP process is described in detail below with reference to FIG. 3 and FIG. 4.

The system constructs the 3D-based point cloud alignment loss component $L_{3D}$ as follows:

$$L_{3D} = \|T'-I\|_1 + \|r\|_1, \tag{5}$$

where $\|.\|_1$ denotes the L1-norm, I is the identity matrix, and r is the residual registration error.

Next, the system constructs an image reconstruction loss component that maintains photometric consistency of (i) the particular image $X_{t-1}$ and a first reconstructed image $\hat{X}_{t-1}$ generated from the second image $X_t$, and of (ii) the second image $X_t$ and a second reconstructed image $\hat{X}_t$ generated from the particular image $X_{t-1}$ (step 210).

In particular, the system projects the estimated point cloud $\hat{Q}_{t-1}$ on to the camera at image t-1 as $K\hat{Q}_{t-1}$, where K is the camera intrinsic matrix. The system then combines this transformation and projection with Eq. (1) to establish a mapping from image coordinates at time t to image coordinates at time t-1. Based on this mapping, the system reconstructs an image $\hat{X}_t$ by warping $X_{t-1}$ based on the depth output $D_t$ and the first transformation matrix $T_t$:

$$\hat{X}_t^{ij} = X_{t-1}^{\hat{i}\hat{j}}, [\hat{i},\hat{j},1]^T = KT_t(D_t^{ij} \cdot K^{-1}[i,j,1]^T). \tag{6}$$

Similarly, the system reconstructs an image $\hat{X}_{t-1}$ by warping $X_t$ based on the depth output $D_{t-1}$ and $T_t^{-1}$, which is the inverse of the first transformation matrix $T_t$.

Computing $\hat{X}_t$ involves creating a mapping from image coordinates in $X_t$ to $X_{t-1}$. However, due to the camera's motion, some pixel coordinates in $X_t$ may be mapped to coordinates that are outside the image boundaries in $X_{t-1}$. With forward ego-motion, this problem is usually pronounced when computing $\hat{X}_{t-1}$ from $X_t$. Including such pixels in the loss function degrades performance of the depth and camera motion networks. Previous approaches have either ignored this problem, or tried to tackle it by adding a general-purpose mask to the network, which is expected to exclude regions that are unexplainable due to any reason. However, this approach is not effective and often results in edge artifacts in depth images.

To solve the above problem, here the system analytically computes validity masks from the depth outputs and the first transformation matrix (ego-motion). For every pair of images $X_{t-1}$ and $X_t$ in the sequence of training images, the system can create a pair of validity masks $M_{t-1}$ and $M_t$. $M_{t-1}$ indicates which pixel coordinates are valid when reconstructing $\hat{X}_{t-1}$ from $X_t$. $M_t$ indicates which pixel coordinates are valid when reconstructing $\hat{X}_t$ from $X_{t-1}$.

More specifically, the system analytically computes the first validity mask $M_{t-1}$ that indicates valid pixel coordinates in the first reconstructed image $\hat{X}_{t-1}$ based on the first depth estimate $D_{t-1}$ and the first transformation matrix $T_t$. The system further analytically compute the second validity mask $M_t$ that indicates valid pixel coordinates in the second reconstructed image $\hat{X}_t$ based on the second depth estimate $D_t$ and an inverse of the first transformation matrix $T_t^{-1}$.

After computing validity masks, the system then compares the reconstructed image $\hat{X}_t$ and $\hat{X}_{t-1}$ to the particular and second images $X_t$ and $X_{t-1}$ respectively to produce the image reconstruction loss component that is based on photometric consistency as follows:

$$L_{rec} = \Sigma_{ij} \|(X_t^{ij} - \hat{X}_t^{ij})M_t^{ij}\|, \tag{7}$$

where $X_t^{ij}$ denotes an image pixel at coordinates (i, j) of the second image $X_t$, $\hat{X}_t^{ij}$ denote an image pixel at coordinates (i, j) of the reconstruct image $\hat{X}_t$, and $M_t^{ij}$ denote an image pixel at coordinates (i, j) of the validity mask $M_t$. By using the validity mask, the system can avoid spurious losses in out of view areas of the images, thus avoid penalizing areas in which no useful information exists. As a result, the system can improve prediction/estimation quality of the depth and camera motion networks.

Subsequently, the system constructs a structured similarity loss component (step 212). Generally, the structured similarity loss component maintains (i) the similarity of patches in the particular image and the first reconstructed image, and (ii) the similarity of patches in the second image and the second reconstructed image.

In particular, the system aims to minimize the structured similarity loss component $L_{SSIM}$ defined as follows:

$$L_{SSIM} = \Sigma_{ij}[1 - SSIM(\hat{X}_t^{ij}, X_t^{ij})]M_t^{ij}, \tag{8}$$

where SSIM(x, y) measures the similarity between two images patches x and y and is defined as follows:

$$SSIM(x, y) = \frac{(2\mu_x\mu_y + c_1)(2\sigma_{xy} + c_2)}{(\mu_x^2 + \mu_y^2 + c_1)(\sigma_x + \sigma_y + c_2)}, \tag{9}$$

where $\mu_x$, $\sigma_x$ are the local means and variances.

The system then constructs a depth smoothness loss component to regularize depth estimates (step 214). The depth smoothness loss component allows for (i) sharp changes in the first depth estimate $D_{t-1}$ at pixel coordinates where there are sharp changes in the particular image $X_{t-1}$, and (ii) sharp changes in the second depth estimate $D_t$ at pixel coordinates where there are sharp changes in the second image $X_t$. The depth smoothness loss takes into account the gradients of a given image X and can be presented as follows:

$$L_{sm} = \Sigma_{ij} \|\partial_x D^{ij}\| e^{-\|\partial_x X^{ij}\|} + \|\partial_y D^{ij}\| e^{-\|\partial_y X^{ij}\|}, \tag{10}$$

where $X^{ij}$ denote an image pixel at coordinates (i, j) of the given image X, $D^{ij}$ is the estimated depth corresponding with $X^{ij}$, and $\partial_x$, $\partial_y$ are the gradients. By considering the gradients of the image X, the depth smoothness loss allows for sharp changes in depth at pixel coordinates where there are sharp changes in the image.

The system constructs a loss function (step 216). In some implementations, the loss function includes only on the 3D-based point cloud alignment loss components. In some implementations, the loss function is a weighted combination of the 3D-based point cloud alignment loss component and one or more of (i) the image reconstruction loss component, (ii) the structured similarity loss component, or (iii) the depth smoothness loss component. For example, the loss function can have the following form:

$$L = \Sigma_s \alpha L_{rec}^s + \beta L_{3D}^s + \gamma L_{sm}^s + \omega L_{SSIM}^s, \tag{11}$$

where all loss components are applied at four different scales s ranging from an input resolution of the input images in the obtained training data to an image having a smaller resolution (for example, an image that is $$\frac{1}{4}, \frac{1}{8} \text{ or } \frac{1}{10}$$

in width and height of the input images. $\alpha$, $\beta$, $\gamma$, $\omega$ are predetermined hyper-parameters. For example, $\alpha=0.85$, $\beta=0.1$, $\gamma=0.05$, and $\omega=0.15$. As another example, $\alpha=0.5$, $\beta=0.3$, $\gamma=0.2$, and $\omega=0$. As another example, $\alpha=0.1$, $\beta=0.2$, $\gamma=0.3$, and $\omega=0.4$.

The system then generates an estimate of a gradient of the loss function and backpropagates the estimate of the gradient to jointly adjust the current values of depth parameters of the depth network and the current values of motion parameters of the camera motion network (step 218). The system can jointly adjust the current values of the depth and motion parameters to minimize the loss function by using mini-batch stochastic optimization or stochastic gradient optimization method.

The system repeats the above steps 202-218 for other images in the sequence of training images to determine trained values of depth parameters of the depth network and the trained values of motion parameters of the camera motion network.

Figure 3:
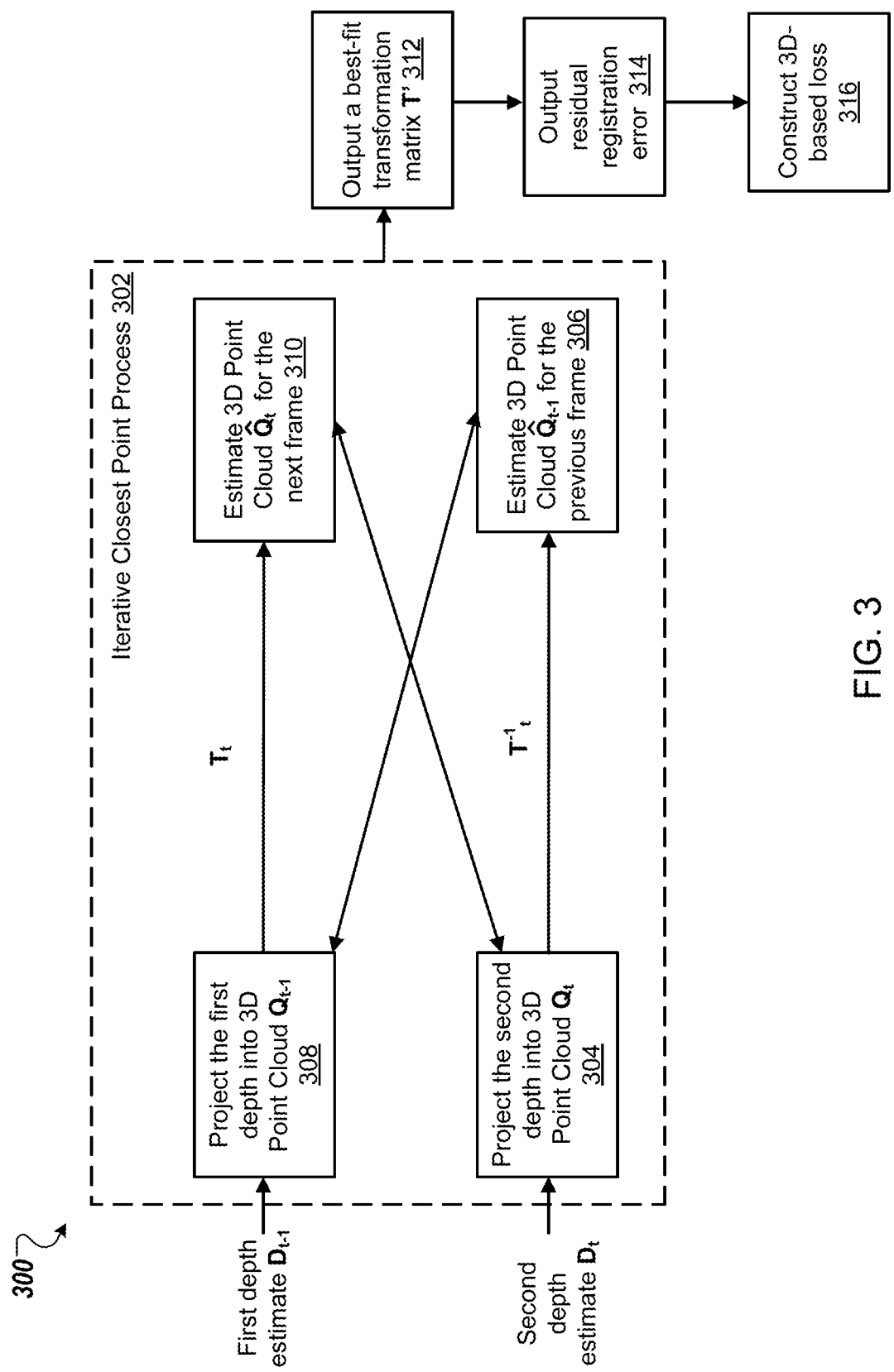
FIG. 3 is a flow diagram for generating a 3D-based point cloud alignment loss.

FIG. 3 is a flow diagram of an example process 300 for generating the 3D-based point cloud alignment loss component. For convenience, the process 300 will be described as being performed by a system of one or more computers located in one or more locations. For example, a neural network system or a component of a neural network system, e.g., the training engine 118 of the neural network system 100 of FIG. 1, appropriately programmed, can perform the process 300.

As described above with reference to FIG. 2, to generate the 3D-based point cloud alignment loss component (hereafter also referred to as 3D-based loss), the system first generates a 3D point cloud $Q_t$ for the second image $X_t$ based on the second depth estimate $D_t$ of the second image $X_t$ (step 304). Each image pixel at coordinate (i, j) with a corresponding estimated depth value $D_t^{ij}$ can be projected into the structured 3D point cloud $Q_t$ using Eq. 1.

Given the inverse of the first transformation matrix $T_t^{-1}$, the system transforms the 3D point cloud $Q_t$ to estimate the previous image (the particular image $X_{t-1}$)'s point cloud $\hat{Q}_{t-1}$ using Eq. 2 (step 306).

Similarly, the system generates a 3D point cloud $Q_{t-1}$ for the particular image $X_{t-1}$ based on the first depth estimate $D_{t-1}$ of the particular image $X_{t-1}$ (step 308). Each image pixel at coordinate (i, j) with a corresponding estimated depth value $D_{t-1}^{ij}$ can be projected into the structured 3D point cloud $Q_{t-1}$ based ion Eq. 3.

The system then transforms the 3D point cloud $Q_{t-1}$, using the first transformation matrix $T_t$ to obtain an estimate of the second image $X_t$'s point cloud $Q_t$ based on Eq. 4 (step 310).

To construct the 3D-based point cloud alignment loss component, the system uses an Iterative Closest Point (ICP) process 302 to obtain a best-fit transformation T' that minimizes point-to-point distances between two point clouds.

In particular, the ICP process 302 takes as input two point clouds A and B, for example, point clouds $\hat{Q}_{t-1}$ and $Q_{t-1}$, or point clouds $\hat{Q}_t$ and $Q_t$. For convenience, the following description describes the ICP process 302 when taking as input two point clouds $\hat{Q}_{t-1}$ and $Q_{t-1}$, but it should be understood that the ICP process 302 is the same for both pair of point clouds.

Given the two point clouds $\hat{Q}_{t-1}$ and $Q_{t-1}$, the ICP process 302 outputs the best-fit transformation T' (step 312) which minimizes the distance between the transformed points in A and their corresponding points in B:

$$\underset{T'}{\mathrm{argmin}} \frac{1}{2} \sum_{i,j} \|T' \cdot A^{ij} - B^{c(ij)}\|^2 \qquad (12)$$

where c(.) denotes the point to point correspondence found by ICP method (for example, by using a simple closest point heuristic). The system further uses the ICP process 302 to output, for each pixel coordinate (i,j), a residual $r^{ij} = A^{ij} - T'_{t-1} \cdot B^{c(ij)}$ (step 314). The residual reflects the residual distances between corresponding points after the ICP's best-fit transformation T' for minimizing point-to-point distances has been applied.

The system constructs the 3D-based point cloud alignment loss component $L_{3D}$ as follows:

$$L_{3D} = \|T'_t - I\|_1 + \|r_t\|_1,$$

where $\|.\|_1$ denotes the L1-norm, I is the identity matrix, and r is the residual registration error (step 316).

Figure 4:
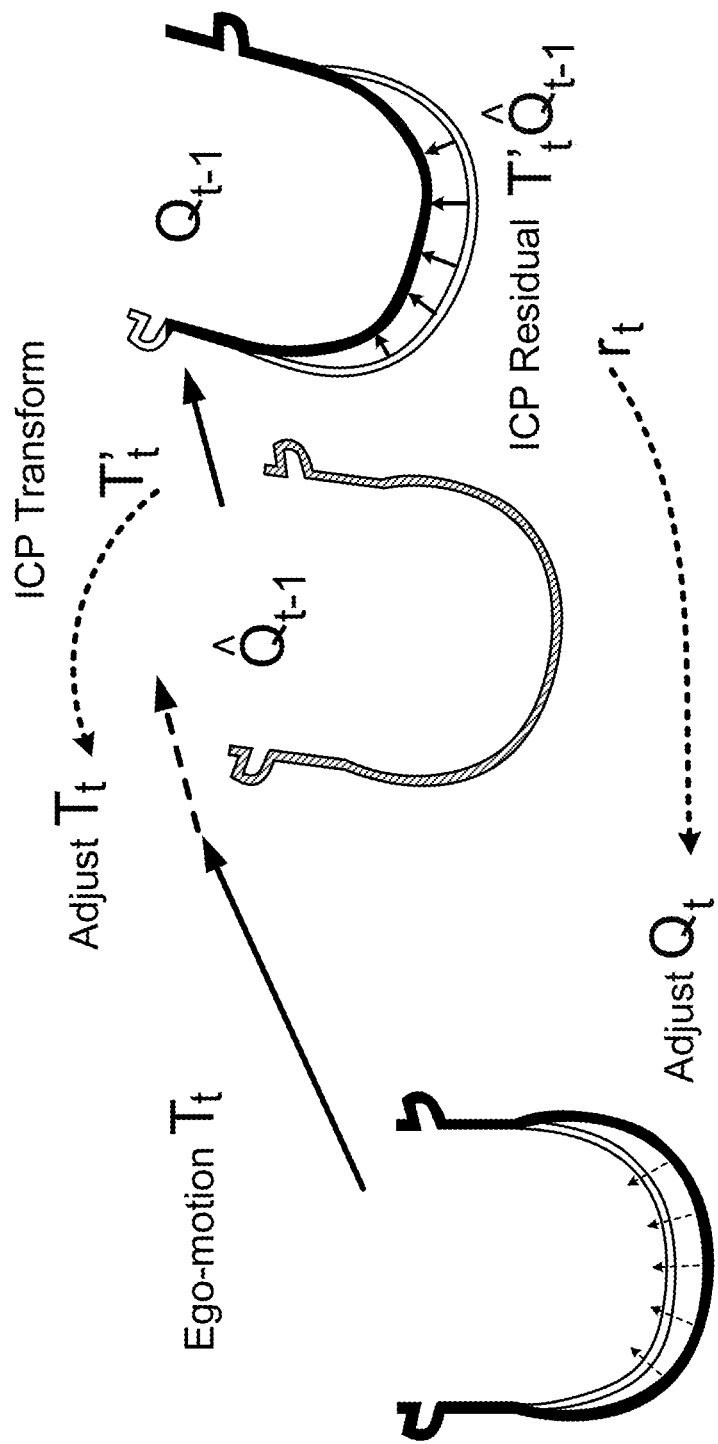
FIG. 4 illustrates how an ICP process is used to penalize errors in a transformation matrix and a depth estimate.

FIG. 4 demonstrates how the system use the ICP process to penalize errors in the first transformation matrix (ego-motion) $T_t$ and the second depth estimate $D_t$. The illustration shows a top view of a car front with side mirrors. Given the depth estimate $D_t$ for time t, the system creates the point cloud $Q_t$, which is then transformed by the first transformation matrix $T_t$ into a prediction of the previous image's point cloud, $\hat{Q}_{t-1}$. If the first transformation matrix $T_t$ and $D_t$ from the depth and camera-motion networks are perfect, $\hat{Q}_{t-1}$ would align perfectly with $Q_{t-1}$. When this is not the case, the system aligns $\hat{Q}_{t-1}$ to $Q_{t-1}$ with ICP to generate a best-fit transformation matrix $T'_t$ and the residuals $r_t$. The system then uses $T'_t$ and $r_t$ to adjust $T_t$ and $D_t$ toward a better initial alignment. More specifically, the system uses $T'_t$ as an approximation to a negative gradient of the 3D-based loss with respect to the ego-motion $T_t$ and uses $r_t$ as an approximation to the negative gradient of the 3D-based loss with respect to the depth estimate $D_t$.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A system comprising:
a neural network implemented by one or more computers, wherein the neural network comprises an image depth prediction neural network and a camera motion estimation neural network, wherein the neural network is configured to receive a sequence of images, and
process each image in the sequence of images using the image depth prediction neural network to generate, for each image, a respective depth output that characterizes a depth of the image, and
process a subset of images in the sequence of images using the camera motion estimation neural network to generate a camera motion output that characterizes the motion of a camera between the images in the subset,
wherein the image depth prediction neural network and the camera motion estimation neural network have been jointly trained using an unsupervised learning technique, and
wherein the camera motion output specifies a transformation matrix that transforms the position and orientation of the camera from its point of view while taking a first image in the subset to its point of view while taking a second image in the subset.

2. The system of claim 1, wherein the sequence of images are frames of a video captured by the camera.

3. The system of claim 1, wherein the depth output comprises an estimated depth value for each pixel of a plurality of pixels in the image that represents a respective distance of a scene depicted at the pixel from a focal plane of the image.

4. The system of claim 1, wherein the image depth prediction neural network includes convolutional neural network layers.

5. The system of claim 1, wherein the camera motion estimation neural network includes convolutional neural network layers.

6. The system of claim 1, wherein the subset of images includes two images in the sequence of images.

7. The system of claim 1, wherein the subset of images includes three or more images in the sequence of images.

8. One or more non-transitory computer-readable storage media storing instructions that, when executed by one or more computers, cause the one or more computers to perform operations comprising:
receiving a sequence of images;
processing, using an image depth prediction neural network, each image in the sequence of images to generate, for each image, a respective depth output that characterizes a depth of the image; and
processing, using a camera motion estimation neural network, a subset of images in the sequence of images to generate a camera motion output that characterizes the motion of a camera between the images in the subset,
wherein the image depth prediction neural network and the camera motion estimation neural network have been jointly trained using an unsupervised learning technique, and
wherein the camera motion output specifies a transformation matrix that transforms the position and orientation of the camera from its point of view while taking a first image in the subset to its point of view while taking a second image in the subset.

9. The one or more non-transitory computer-readable storage media of claim 8, wherein the sequence of images are frames of a video captured by the camera.

10. The one or more non-transitory computer-readable storage media of claim 8, wherein the depth output comprises an estimated depth value for each pixel of a plurality of pixels in the image that represents a respective distance of a scene depicted at the pixel from a focal plane of the image.

11. The one or more non-transitory computer-readable storage media of claim 8, wherein the image depth prediction neural network includes convolutional neural network layers.

12. The one or more non-transitory computer-readable storage media of claim 8, wherein the camera motion estimation neural network includes convolutional neural network layers.

13. The one or more non-transitory computer-readable storage media of claim 8, wherein the subset of images includes two images in the sequence of images.

14. The one or more non-transitory computer-readable storage media of claim 8, wherein the subset of images includes three or more images in the sequence of images.

15. A computer-implemented method comprising:
receiving a sequence of images;

processing, using an image depth prediction neural network, each image in the sequence of images to generate, for each image, a respective depth output that characterizes a depth of the image; and processing, using a camera motion estimation neural network, a subset of images in the sequence of images to generate a camera motion output that characterizes the motion of a camera between the images in the subset, wherein the image depth prediction neural network and the camera motion estimation neural network have been jointly trained using an unsupervised learning technique, and wherein the camera motion output specifies a transformation matrix that transforms the position and orientation of the camera from its point of view while taking a first image in the subset to its point of view while taking a second image in the subset.

16. The method of claim 15, wherein the sequence of images are frames of a video captured by the camera.

17. The method of claim 15, wherein the depth output comprises an estimated depth value for each pixel of a plurality of pixels in the image that represents a respective distance of a scene depicted at the pixel from a focal plane of the image.

18. The method of claim 15, wherein at least one of the image depth prediction neural network or the camera motion estimation neural network includes convolutional neural network layers.

19. The method of claim 15, wherein the subset of images includes two images in the sequence of images.

20. The method of claim 15, wherein the subset of images includes three or more images in the sequence of images.

* * * * *